(12) United States Patent
Ang

(10) Patent No.: US 12,018,577 B2
(45) Date of Patent: Jun. 25, 2024

(54) COOLING DEVICE FOR ROTOR ASSEMBLY

(71) Applicant: RTX Corporation, Farmington, CT (US)

(72) Inventor: Jia Liang Ang, Singapore (SG)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/862,558

(22) Filed: Jul. 12, 2022

(65) Prior Publication Data

US 2024/0018884 A1    Jan. 18, 2024

(51) Int. Cl.
| | | |
|---|---|---|
| B23P 15/00 | (2006.01) | |
| B23P 11/02 | (2006.01) | |
| F01D 25/12 | (2006.01) | |
| F01D 25/28 | (2006.01) | |

(52) U.S. Cl.
CPC .......... *F01D 25/285* (2013.01); *B23P 11/025* (2013.01); *B23P 15/006* (2013.01); *F01D 25/12* (2013.01); *F05D 2220/32* (2013.01); *F05D 2230/60* (2013.01); *F05D 2260/201* (2013.01)

(58) Field of Classification Search
CPC .... F01D 25/285; F01D 25/12; F05D 2220/32; F05D 2230/60; F05D 2260/201; B23P 11/025; B23P 15/006
See application file for complete search history.

(56) References Cited

U.S. PATENT DOCUMENTS

| | | | |
|---|---|---|---|
| 6,158,102 A | | 12/2000 | Berry et al. |
| 6,438,837 B1 | * | 8/2002 | Berry ............. F01D 5/066 29/889 |
| 2011/0223025 A1 | * | 9/2011 | Schutte ............ F01D 5/34 416/193 A |
| 2019/0186265 A1 | | 6/2019 | Friedman et al. |

FOREIGN PATENT DOCUMENTS

| | | |
|---|---|---|
| CN | 206316936 U | 7/2017 |
| CN | 208419578 U | 1/2019 |
| CN | 216460893 U | 5/2022 |

OTHER PUBLICATIONS

European Search Report for European Application No. 23184987.8; dated Dec. 15, 2023; 6 pages.

* cited by examiner

*Primary Examiner* — Nirvana Deonauth
(74) *Attorney, Agent, or Firm* — CANTOR COLBURN LLP

(57) ABSTRACT

A cooling device for a rotor assembly of a gas turbine engine includes an airflow nozzle configured to be installed at a cooling location of the rotor assembly. The airflow nozzle extends entirely around a circumference of the rotor assembly and includes a plurality of airflow inlets and a nozzle outlet to direct an airflow toward the cooling location. An airflow source is operably connected to the plurality of airflow inlets.

9 Claims, 6 Drawing Sheets

COOLING DEVICE FOR ROTOR ASSEMBLY

BACKGROUND

Exemplary embodiments of the present disclosure pertain to the art of gas turbine engines, and in particular to assembly of rotors of gas turbine engines.

Rotor assemblies, for example high pressure compressor (HPC) rotor assemblies, of gas turbine engines include a plurality of rotor stages assembled into a stack along a stacking axis. The assembly requires heating of a rotor to be installed to the rotor stack to allow for engagement of "snap" features of adjacent rotor stages. Before proceeding with the next subsequent assembly, the rotor stack must then be cooled. Typically, the rotor stack is allowed to cool naturally in the assembly environment, which takes approximately one hour. Over the entire rotor assembly operation, cooling process of the rotor stack can account for approximately 50% of the total assembly time of the rotor assembly, or about 6 hours.

Due to tight roundness and squareness requirements of the final rotor assembly, previous attempts to cool the rotor stack with, for example, a fan, have had limited or no success.

BRIEF DESCRIPTION

In one embodiment, a cooling device for a rotor assembly of a gas turbine engine includes an airflow nozzle configured to be installed at a cooling location of the rotor assembly. The airflow nozzle extends entirely around a circumference of the rotor assembly and includes a plurality of airflow inlets and a nozzle outlet to direct an airflow toward the cooling location. An airflow source is operably connected to the plurality of airflow inlets.

Additionally or alternatively, in this or other embodiments one or more support rods are operably connected to the airflow nozzle to position the airflow nozzle.

Additionally or alternatively, in this or other embodiments the one or more support rods are adjustable to change a position of the airflow nozzle.

Additionally or alternatively, in this or other embodiments a manifold distributes the airflow from the airflow source to the plurality of airflow inlets.

Additionally or alternatively, in this or other embodiments an airflow valve is operably connected to each airflow inlet of the plurality of airflow inlets to independently control the airflow through the airflow inlet.

Additionally or alternatively, in this or other embodiments the airflow nozzle tapers in width between the plurality of airflow inlets and the nozzle outlet.

Additionally or alternatively, in this or other embodiments a targeting device aids in positioning the nozzle outlet relative to the selected cooling location.

Additionally or alternatively, in this or other embodiments one or more anemometers monitor the airflow from the nozzle outlet.

Additionally or alternatively, in this or other embodiments the airflow is uniform around a circumference of the nozzle outlet.

Additionally or alternatively, in this or other embodiments the airflow nozzle includes a plurality of circumferential nozzle segments.

In another embodiment, a method of assembling a rotor assembly comprising two or more rotor stages includes heating one or more of a first rotor stage or a second rotor stage of the rotor assembly, assembling the first rotor stage to the second rotor stage, and installing a cooling device circumferentially around a selected cooling location of the rotor assembly. The cooling device includes an airflow nozzle configured to be installed at a cooling location of the rotor assembly. The airflow nozzle extends entirely around a circumference of the rotor assembly and includes a plurality of airflow inlets and a nozzle outlet. An airflow source is operably connected to the plurality of airflow inlets. An airflow is urged from the airflow source into the airflow nozzle through the plurality of airflow inlets and out of the nozzle outlet toward the selected cooling location.

Additionally or alternatively, in this or other embodiments the airflow nozzle is supported via one or more support rods operably connected to the airflow nozzle.

Additionally or alternatively, in this or other embodiments the one or more support rods are adjusted to change a position of the airflow nozzle.

Additionally or alternatively, in this or other embodiments the airflow is distributed from the airflow source to the plurality of airflow inlets via a manifold located between the airflow source and the plurality of airflow inlets.

Additionally or alternatively, in this or other embodiments the airflow through the plurality of airflow inlets is independently controlled via an airflow valve operably connected to each airflow inlet of the plurality of airflow inlets.

Additionally or alternatively, in this or other embodiments the airflow nozzle tapers in width between the plurality of airflow inlets and the nozzle outlet.

Additionally or alternatively, in this or other embodiments a targeting device is positioned to aid in positioning the nozzle outlet relative to the selected cooling location.

Additionally or alternatively, in this or other embodiments the airflow from the nozzle outlet is monitored via one or more anemometers.

Additionally or alternatively, in this or other embodiments the airflow is uniform around a circumference of the nozzle outlet.

Additionally or alternatively, in this or other embodiments the airflow nozzle includes a plurality of circumferential nozzle segments.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed device and method are presented herein by way of exemplification and not limitation with reference to the Figures.

Figure 1:
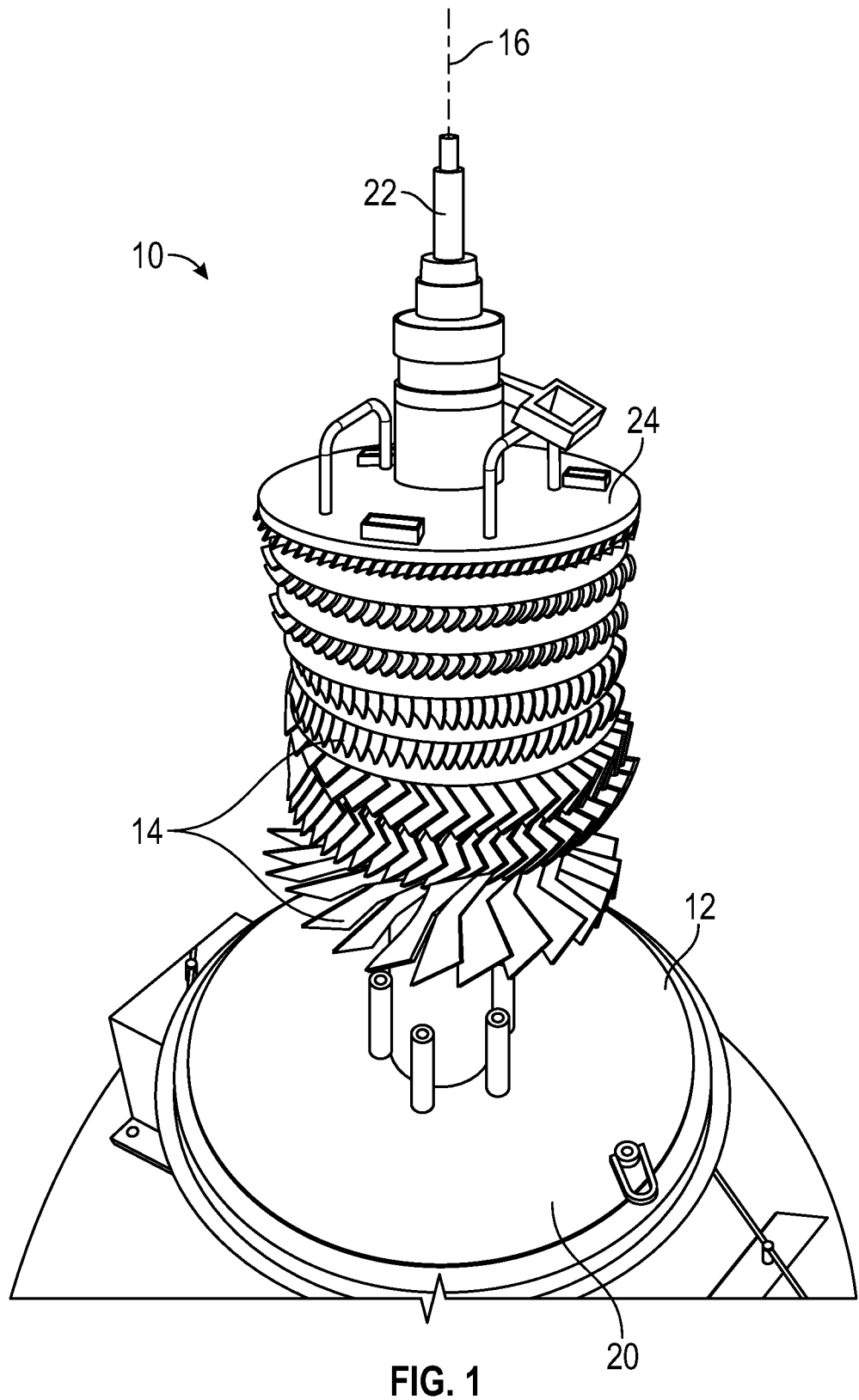
FIG. 1 is a perspective view of an embodiment of a rotor assembly.
Figure 2:
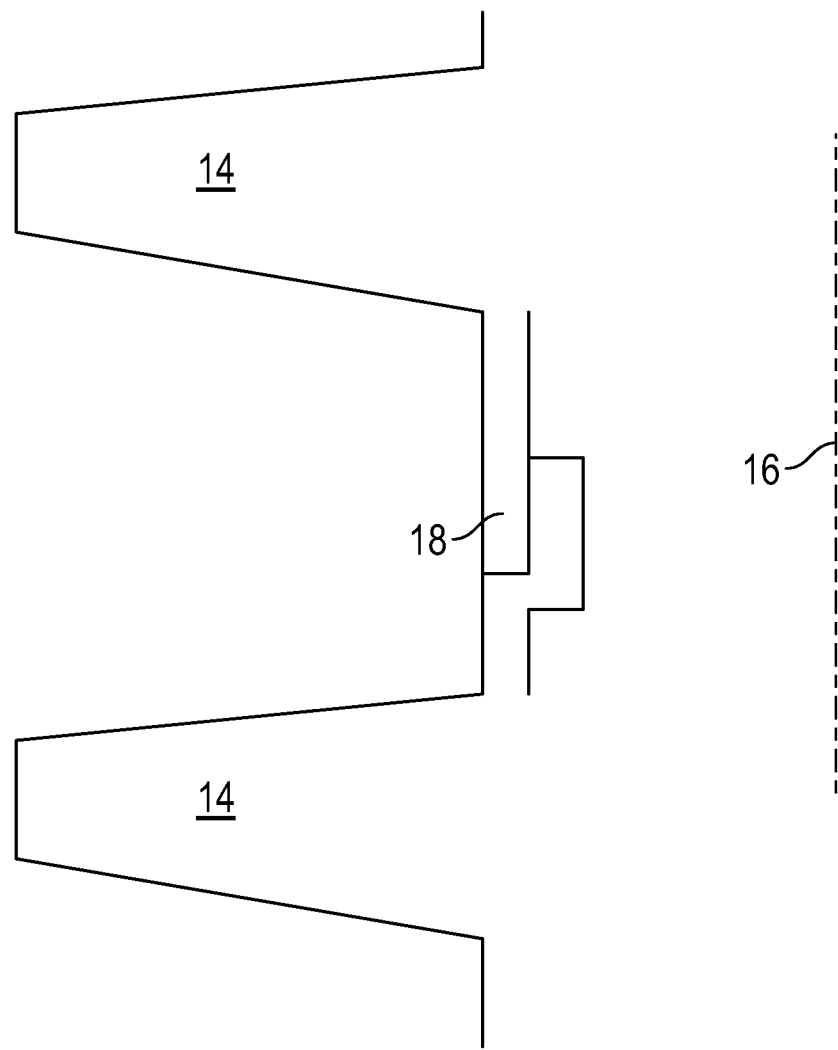
FIG. 2 is a cross-sectional view of an embodiment of a snap connection of a rotor assembly.

FIG. 1 schematically illustrates a rotor assembly 10 on a rotor assembly fixture 12. The rotor assembly 10 includes a plurality of rotor stages 14 stacked along a stacking axis 16. In some embodiments, adjacent rotor stages 14 are assembled via a radial mating snap connection 18, as shown in FIG. 2, between the adjacent rotor stages 14. Referring again to FIG. 1, the rotor assembly fixture 12 includes a fixture plate 20 in which the rotor stages 14 are stacked and a stacking rod 22 defining the stacking axis 16 of the rotor assembly 10. In some embodiments, an upper plate 24 is utilized to hold and apply pressure along the stacking axis 16 to the rotor assembly 10 on the rotor assembly fixture 12 during the assembly process. In order to stack the rotor stages 14 and secure the adjacent rotor stages 14, it is necessary to heat the mating rotor stage 14, stack the rotor stage 14, apply pressure then cool the mating interface 18 after the stacking. This process is repeated until the whole rotor assembly 10 is completed.

Figure 3:
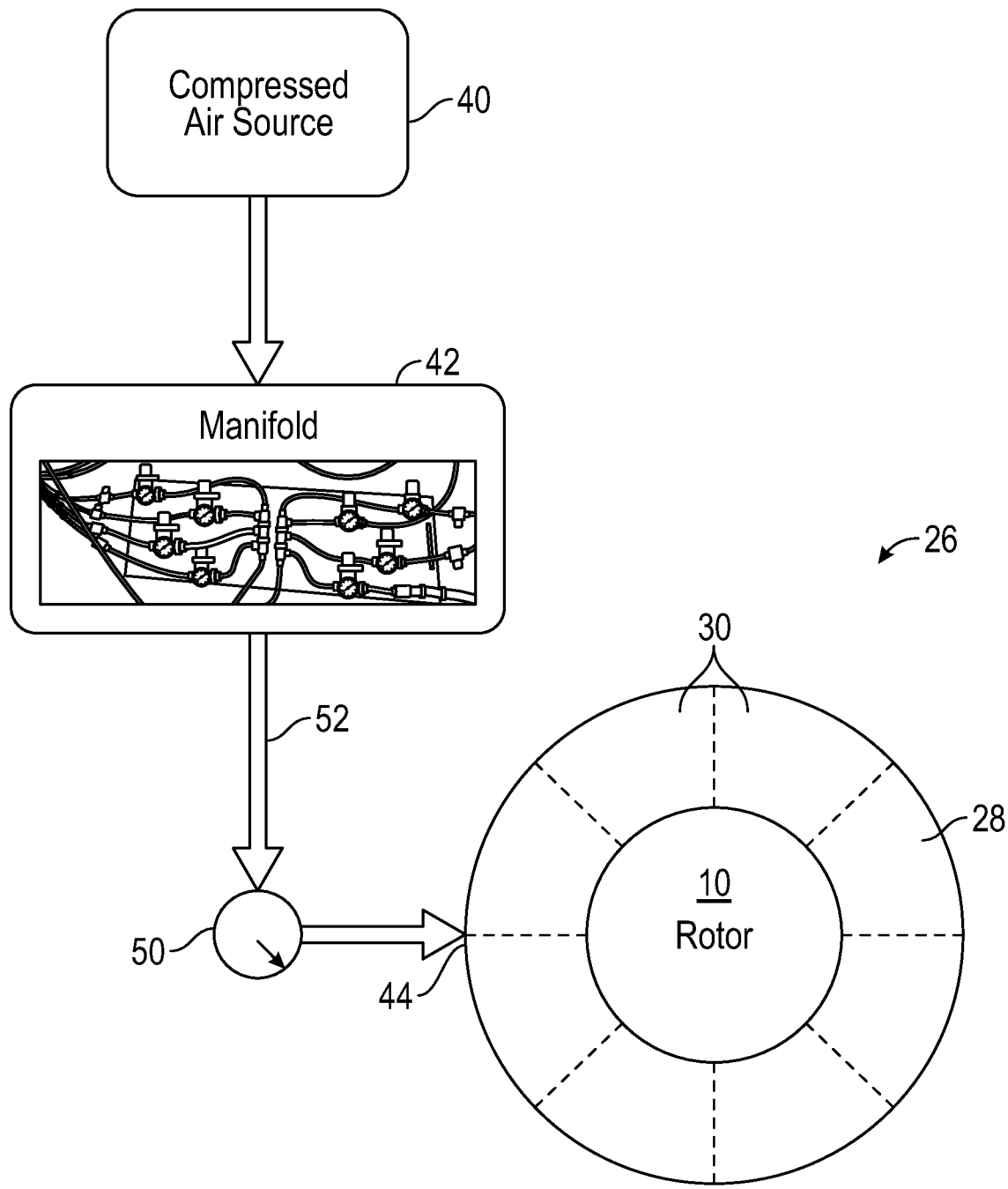
FIG. 3 is a schematic illustration of an embodiment of a cooling device for a rotor assembly.
Figure 4A:
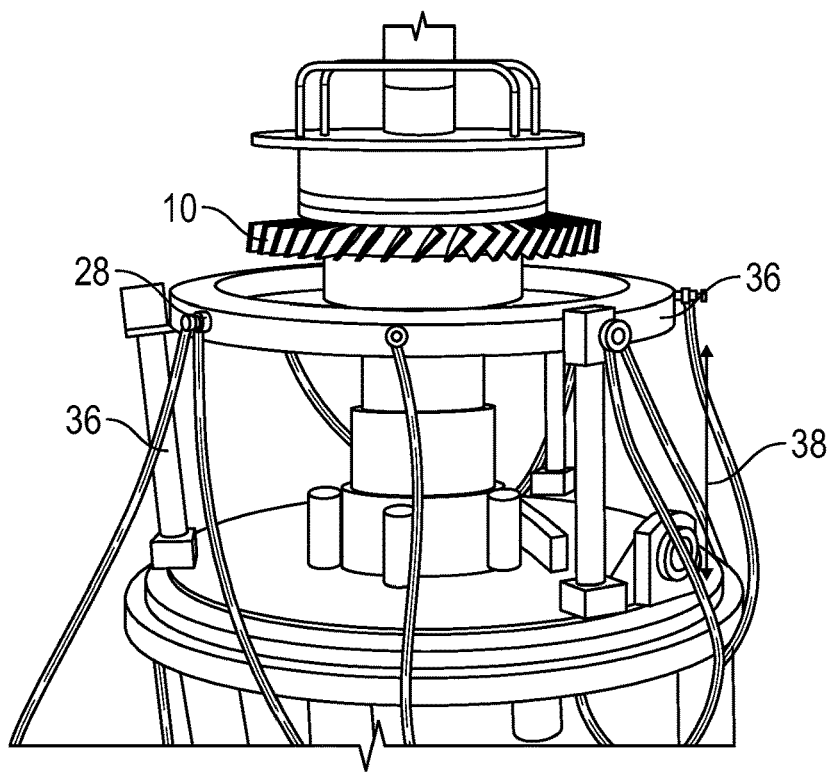
FIG. 4*a* is a perspective view of a rotor assembly and a cooling device in a first position.
Figure 4B:
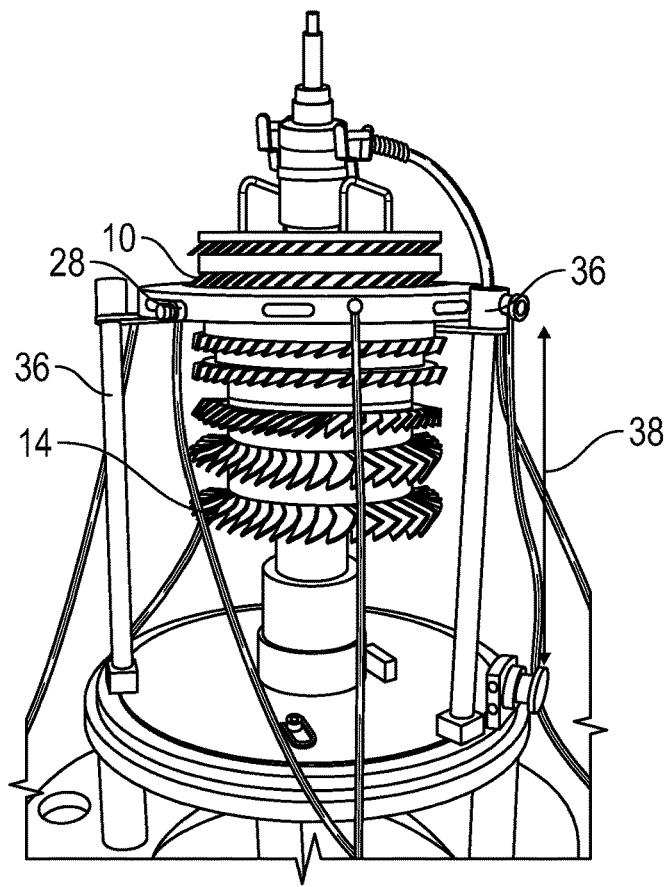
FIG. 4*b* is a perspective view of a rotor assembly and a cooling device in a second position.

Referring now to FIG. 3, to aid in the cooling of the rotor stages 14, a rotor cooling device 26 is utilized. The rotor cooling device 26 includes an air nozzle 28 the extends circumferentially around the rotor assembly 10. In some embodiments, the air nozzle 28 is formed from a plurality of nozzle segments 30 joined to form a circumferential ring air nozzle 28 extending entirely circumferentially around the rotor assembly 10 with a nozzle outlet 32 (shown in FIG. 5) to direct an airflow 34 at a selected location of the rotor assembly 10. The nozzle outlet 32 is a full circumferential ring around the rotor assembly 10. In some embodiments, the nozzle segments 30 each have segment end walls at each circumferential end of the nozzle segment 30. The end walls aid in controlling the airflow 34. Shown in FIGS. 4a and 4b, the air nozzle 28 is supported by a plurality of support rods 36 extending from the fixture plate 20. The support rods 36 are adjustable or replaceable to adjust the nozzle height 38 of the air nozzle 28 relative to the fixture plate 20 so that the airflow 34 is directed from the nozzle outlet 32 to a selected location of the rotor assembly 10 to cool the selected location, for example, the snap connection 18 location of the rotor assembly 10. While in the embodiments described herein support rods 36 are utilized to support the air nozzle 28, one skilled in the art will readily appreciate that the air nozzle 28 may be supported by, for example, robotic arms or structures or the like.

Referring again to FIG. 3, the airflow 34 is directed out of the air nozzle 28 from an air source, for example, a compressed air source 40. From the compressed air source 40, the airflow 34 proceeds through a manifold 42, which splits the airflow 34 into a plurality of airflow streams corresponding to a number of airflow inlets 44 into the airflow nozzle 28.

Figure 5:
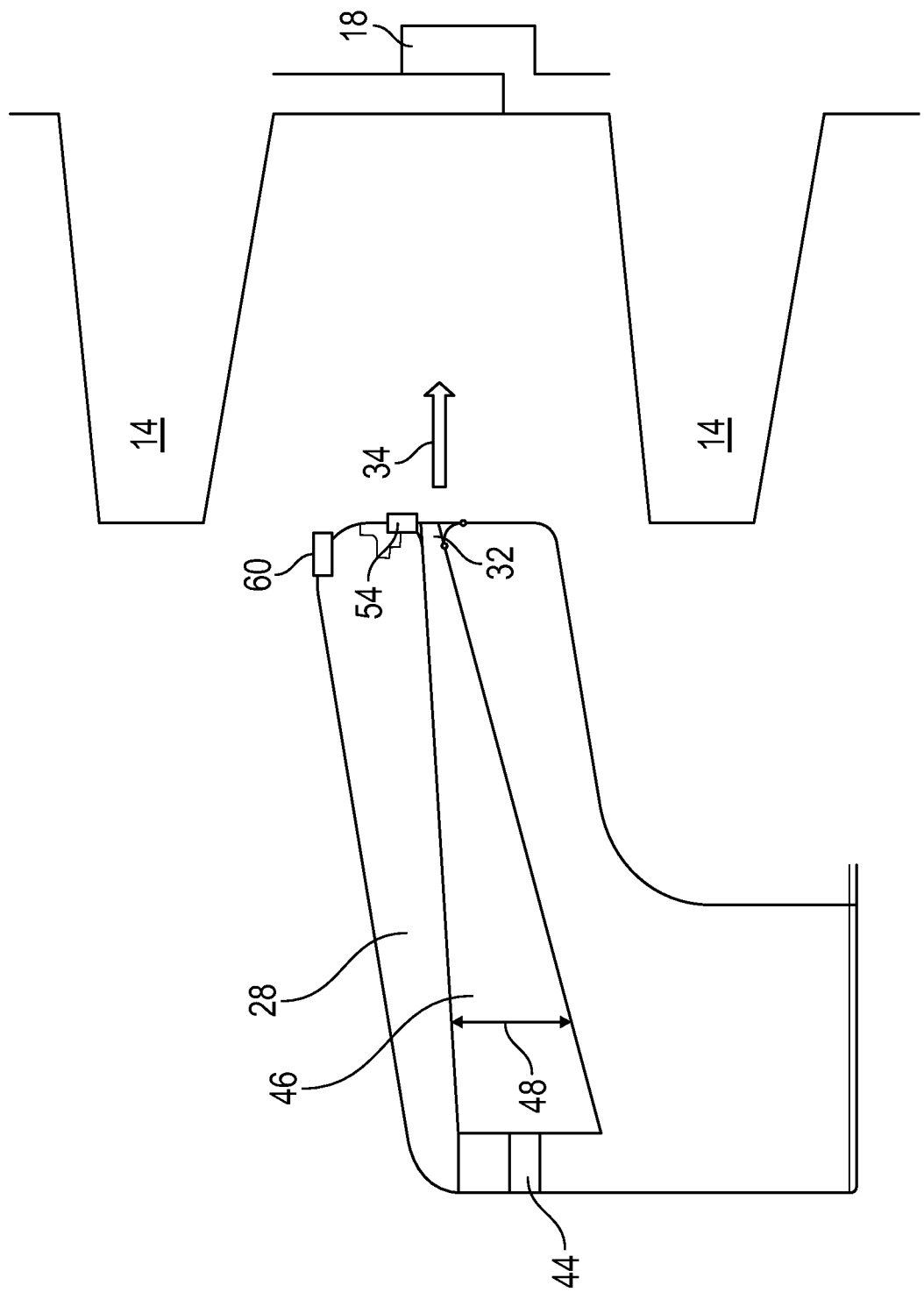
FIG. 5 is a cross-sectional view of an embodiment of an airflow nozzle of the cooling device.

Referring now to FIG. 5, a cross-sectional view of an embodiment of the airflow nozzle 28 is illustrated. The airflow nozzle 28 includes a nozzle channel 46 which extends circumferentially around the airflow nozzle 28 to distribute the airflow 34 uniformly from the plurality of airflow inlets 44, which in some embodiments is eight equally-spaced airflow inlets 44. The nozzle channel 46 tapers radially from a relatively wide axial channel width 48 at the airflow inlets 44 to a relatively axially narrow channel width 48 at the nozzle outlet 32. This tapering accelerates the airflow 34 and allows the airflow 34 to be more uniformly delivered to the selected location of the rotor assembly 10. The nozzle height 38 may be monitored via a targeting device such as a laser pointer 60 or the like located on the air nozzle 28, which is directed toward the rotor assembly 10 as a visual guide on the location at which the airflow 34 is directed. The nozzle 28 then may be axially moved via adjustment or replacement of the support rods 36 until the laser pointer 60 is directed at the selected location.

Referring again to FIG. 3, the airflow 34 into the airflow nozzle 28 may be controlled by airflow valves 50 located along airflow lines 52 between the manifold 42 and the respective airflow inlets 44. The airflow valves 50 may be adjusted individually, so that airflow into each of the airflow inlets 44 is independently controlled. This allows for circumferential adjustment of the airflow 34 into the airflow nozzle 28 and out of the nozzle outlet 32. The airflow 34 exiting the nozzle outlet 32 may be monitored by, for example, one or more anemometers 52 located at circumferential locations around the nozzle outlet 32. This may be achieved by monitoring the airflow 34 with the one or more anemometers 54 (shown in FIG. 5) and adjusting the airflow 34 as needed via the airflow valves 50.

Figure 6:
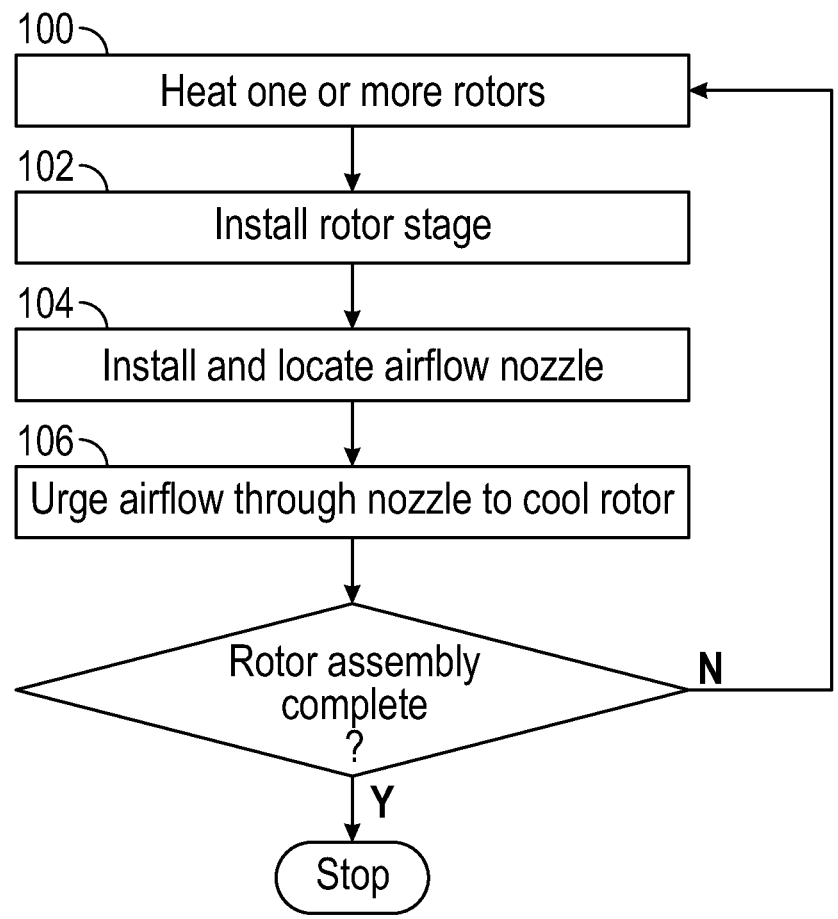
FIG. 6 is a schematic illustration of a method of assembling a rotor assembly.

Referring to FIG. 6, illustrated is a schematic of a process for assembling a rotor assembly 10. At block 100, the mating rotor stage 10 is heated. A rotor stage 10 is installed onto the rotor assembly 14 at step 102. At block 104, the rotor cooling device 26 is installed, and the nozzle outlet 32 is directed at the selected cooling location, for example, the snap connection 18 of the installed rotor stage 14 to the rotor assembly 10. The airflow valves 50 are opened at step 106 to direct airflow 34 through the nozzle outlet 32 to the selected cooling location to cool the rotor assembly 10. This process is then repeated as subsequent rotor stages 14 are installed to the rotor assembly 10.

The use of the airflow nozzle 28 extending entirely circumferentially around the rotor assembly 10 allows for a uniform airflow 34 to be precisely directed at a desired cooling location of the rotor assembly 10, and accelerates the cooling process which will result in a reduction in time required for rotor assembly, while also ensuring that the roundness and squareness requirements of the final rotor assembly 14 are not affected by this cooling process.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assembling a rotor assembly comprising two or more rotor stages, the method comprising:
   heating one or more of a first rotor stage and a second rotor stage of the rotor assembly;
   assembling the first rotor stage to the second rotor stage;
   installing a cooling device circumferentially around a selected cooling location of the rotor assembly, the cooling device including:
      an airflow nozzle configured to be installed at the selected cooling location of the rotor assembly, the airflow nozzle extending entirely around a circumference of the rotor assembly and including:
         a plurality of airflow inlets; and
         a nozzle outlet; and
      an airflow source operably connected to the plurality of airflow inlets; and
   urging an airflow from the airflow source into the airflow nozzle through the plurality of airflow inlets and out of the nozzle outlet toward the selected cooling location;
   the cooling device further comprising supporting the airflow nozzle via a plurality of supports rods operably connected to the airflow nozzle, the plurality of support rods extending between a circumferential ring of the airflow nozzle located at a first end of each of the plurality of support rods and a rotor fixture plate located at a second end of each of the plurality of support rods.

2. The method of claim 1, further comprising adjusting the plurality of support rods to change a position of the airflow nozzle.

3. The method of claim 1, further comprising distributing the airflow from the airflow source to the plurality of airflow inlets via a manifold located between the airflow source and the plurality of airflow inlets.

4. The method of claim 1, further comprising independently controlling the airflow through the plurality of airflow inlets via an airflow valve operably connected to each airflow inlet of the plurality of airflow inlets.

5. The method of claim 1, wherein the airflow nozzle tapers in width between the plurality of airflow inlets and the nozzle outlet.

6. The method of claim 1, further comprising a targeting device to aid in positioning the nozzle outlet relative to the selected cooling location.

7. The method of claim 1, further comprising monitoring the airflow from the nozzle outlet via one or more anemometers.

8. The method of claim 1, wherein the airflow is uniform around a circumference of the nozzle outlet.

9. The method of claim 1, wherein the airflow nozzle comprises a plurality of circumferential nozzle segments.

* * * * *